(12) United States Patent
Dwivedi et al.

(10) Patent No.: US 12,151,907 B1
(45) Date of Patent: Nov. 26, 2024

(54) CONTAINER DUMPERS HAVING CONTROLLED UNLOADING

(71) Applicant: Amazon Technologies, Inc., Seattle, WA (US)

(72) Inventors: Rajeev Dwivedi, Sammamish, WA (US); Parth Kamlesh Champaneri, Lynnwood, WA (US); Nikhil Madan Yardi, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 275 days.

(21) Appl. No.: 17/691,659

(22) Filed: Mar. 10, 2022

(51) Int. Cl.
*B65G 65/00* (2006.01)
*B65G 65/02* (2006.01)

(52) U.S. Cl.
CPC ........ *B65G 65/005* (2013.01); *B65G 65/02* (2013.01); *B65G 2203/0208* (2013.01); *B65G 2203/0283* (2013.01); *B65G 2203/042* (2013.01); *B65G 2814/03* (2013.01)

(58) Field of Classification Search
CPC .............. B65G 65/02; B65G 2203/0283; B65G 65/23; B65G 2814/0358; B65G 65/34; B65G 15/22
USPC ............................ 414/780, 784; 198/370.04
See application file for complete search history.

(56) References Cited

U.S. PATENT DOCUMENTS

| 902,410 A * | 10/1908 | Jackson et al. ......... B21B 39/22 198/406 |
| 8,651,794 B2 * | 2/2014 | Pippin .................... B65G 67/24 414/797.6 |
| 2010/0050574 A1 * | 3/2010 | Cedrone ............... B67C 7/0033 53/471 |
| 2019/0322475 A1 * | 10/2019 | Hartmann ............. B65G 65/23 |

* cited by examiner

*Primary Examiner* — Lynn E Schwenning
(74) *Attorney, Agent, or Firm* — Eversheds Sutherland (US) LLP

(57) ABSTRACT

Systems and methods are disclosed for container dumpers having controlled unloading. In one embodiment, an example container unloading system may include a container support mechanism configured to secure a container, where the container has items inside, and a first conveyor configured to rotate from a first position to a second position. The first conveyor may be disposed in a vertical orientation adjacent to a sidewall of the container in the first position, and the first conveyor may be disposed in a non-vertical orientation adjacent to the sidewall of the container in the second position. The system may include a controller configured to cause the container support mechanism to rotate the container from a vertical orientation to a rotated orientation, and cause the first conveyor to be actuated, such that the items are conveyed out of the container by the first conveyor.

18 Claims, 9 Drawing Sheets

CONTAINER DUMPERS HAVING CONTROLLED UNLOADING

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that throughput can be increased and sustainability can be improved.

Figure 1:
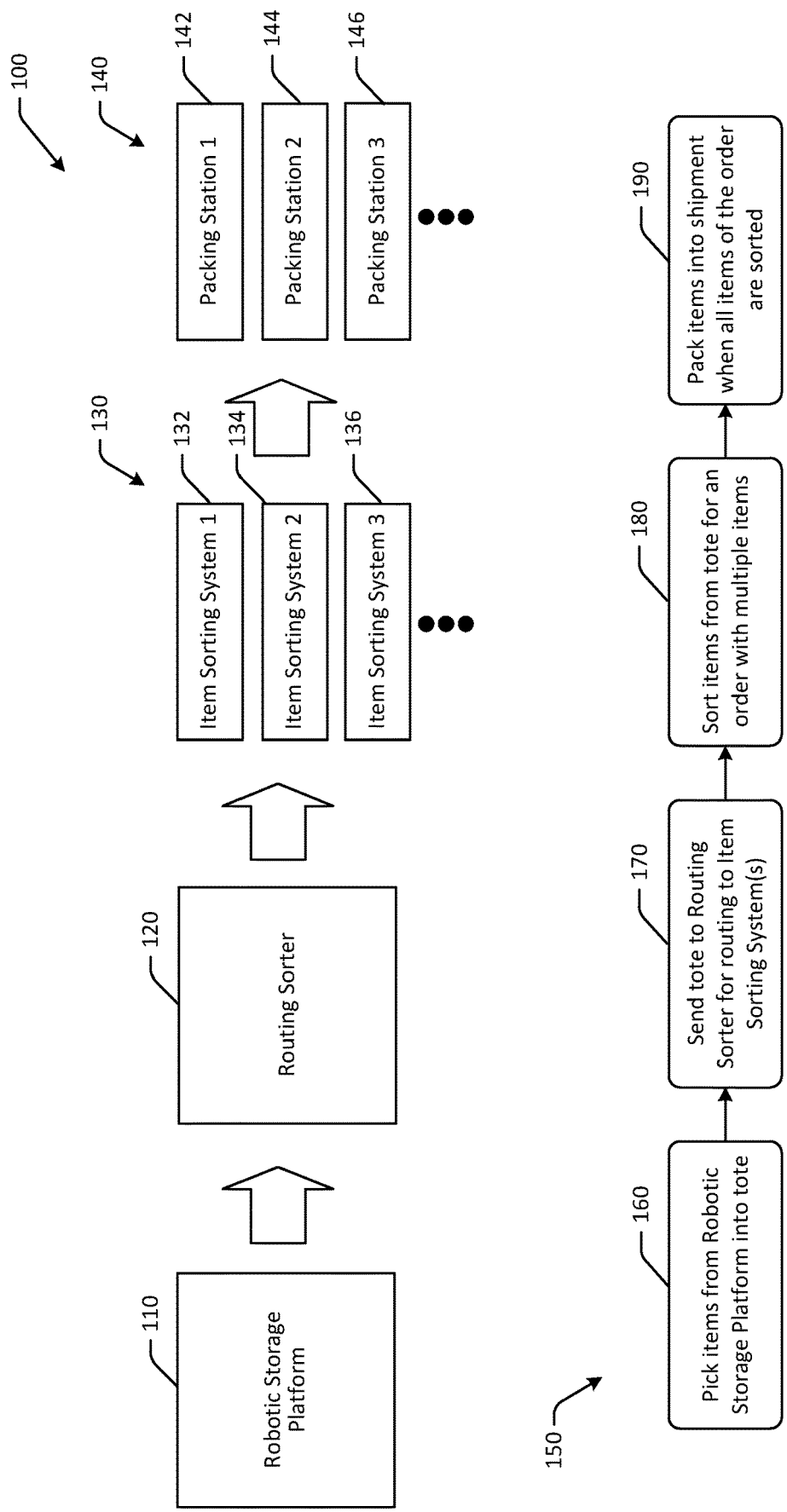
FIG. 1 is a hybrid schematic illustration of an example use case for container dumpers having controlled unloading and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products and/or shipping of packages in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. Products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, in some instances, items that are part of the same order may not all be in the same fulfillment center or other location. For example, a first product in an order of two items may be at a first fulfillment center, and a second product in the same order may be at a second fulfillment center. In such instances, instead of shipping the two items in the order separately, such as one from each fulfillment center, items may be transferred from one fulfillment center to another, and then aggregated with other items in the order and shipped together. Such fulfillment center-to-fulfillment center transfers of items may be processed similar to items that are to be shipped to consumers. For example, the items to be transferred may be picked, routed to a sortation machine, sorted into a particular container (e.g., a container designated for a particular fulfillment center, etc.), packed, and sent. In some instances, containers destined for other fulfillment centers may be infinite bottom containers, or containers that may be filled without consideration of a level of fullness or remaining capacity of the container. In such instances, capacity of the containers may be monitored externally (e.g., by a user manually, by a camera system automatically, using different sensors, etc.). Full containers may be removed from a sortation system and replaced with an empty container to continue aggregating items destined for a fulfillment center.

As items are placed into containers or packages for transport, sortation, etc., the packages may be placed in containers, such as foldable carts, Gaylords, cardboard containers, and/or other container types that are configured to hold a plurality of packages. For example, a foldable cart may be filled with packages that are destined for another fulfillment center or other facility. The foldable carts and other containers described herein may be used not only to store packages or other items, but may also be used to transport the packages to another facility. For example, in some embodiments, the foldable containers may be filled with packages, and the filled foldable container may be loaded onto a truck and transported to another facility. This may allow for increased efficiency and reduced handling of individual packages, and may also provide the ability for foldable containers to be used across any number of facilities and/or workstations within a facility.

Once the foldable container is unloaded from a truck, or otherwise reaches its destination within a facility (e.g., if the container does not leave a facility, etc.), containers may be unloaded or dumped so as to remove its contents (e.g., from its open top, etc.). For example, a Gaylord may be unloaded by dumping its contents onto a conveyor or other surface. Likewise, other container types, such as cardboard containers, foldable carts, and so forth may be dumped onto a conveyor or other surface, such that the packages or other items inside the container fall onto the conveyor. Containers may be dumped manually (e.g., using equipment, etc.) or automatically. However, depending on the characteristics of the items inside the container, damage may occur to items as they are dumped or otherwise unloaded from containers. For example, if a heavy package or heavy item falls onto a soft or fragile package or item, the soft or fragile item may be damaged. In addition, depending on a speed of unloading, items or packages may fall off sides of a conveyor. Accordingly, controlled unloading or controlled dumping of container contents may be desired, so as to reduce risk of damage to items, risk of overflow from conveyors or other surfaces, and so forth.

Embodiments of the disclosure include container unloading systems that allow for gradual package or item transition out of the container and onto a surface, such as a conveyor, so as to reduce mechanical impact and enhanced singulation (e.g., spacing on the conveyor between individual items, etc.). During a dumping process, items may be subject to an impact load arising from uncontrolled item drop from a height, items landing on top of each other with impact (which may include packages stacking on top of each other), and so forth. Embodiments reduce the likelihood of item or package damage by using a conveyor system aided container dumper that includes controlled package or item unloading and reduce the instances of packages or items landing on each other with impact. Some embodiments include a set of one or more conveyors (such as conveyor belts, rollers, motorized drive rollers, etc.) arranged in sequence that engage with a downstream conveyor. The conveyors define one or more zones of item transfer. The side of the container is opened and engaged with the conveyor of the container dumping system. Then the conveyors along with the dumper are tilted or otherwise rotated in a controlled manner. The downstream takeaway belt can also optionally change its configuration based on the tilt and zone engagement of the container dumper. Embodiments may sequentially engage individual conveyors to move items out of the container without relying solely on gravity. By sequential engagement of the conveyor zones, a smaller number of packages are engaged at any given time, thereby reducing the impact imparted from item dropping from upper levels. Similarly, the interface of the takeaway belt and the conveyor zone belts adds a point of separation. The point of separation enhances the item separation and prevents stack build up. Items are transferred with diminished mechanical impact.

Embodiments may therefore increase throughput and speed of consolidating items for multi-item orders and/or consolidating packages that are destined for certain related destinations, such as other fulfillment centers. Some embodiments include optimized process flows for processing of orders at fulfillment centers, as well as process flows or equipment to increase speed of consolidating products in a multi-item order and/or speed of sorting packages. As a result, throughput of fulfillment centers may be improved, and/or logistics of fulfillment center operations may be less complicated.

Referring to FIG. 1, an example use case 100 for container unloading systems for various container types and an example process flow in accordance with one or more embodiments of the disclosure. Although discussed in the context of online orders, other embodiments may be directed to any suitable use case where products are picked and sorted, or packages are sorted, such as instances where users may pick up orders rather than receiving a shipment, instances where items are aggregated for transport to another fulfillment center, and so forth.

In FIG. 1, a fulfillment center may include a robotic storage platform 110, a routing sorter 120, one or more item sorting systems 130, and one or more packing stations 140. The robotic storage platform 110 may be a portion of the fulfillment center at which products picked from product inventory are placed. Inventory may be stored in containers in foldable containers in some instances. Robots may be used to pick products from inventory and to deliver to the robotic storage platform in some instances, while in other instances, manual effort or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. The tote may be assigned to, or otherwise associated with, a particular item sorting system machine in some instances. For example, a certain tote may be associated with a certain item sorting system, such that products that are designated to be picked and placed in the tote are for orders that are to be consolidated at that particular item sorting system. The association between the tote and the item sorting system may be static in some instances. In other embodiments, there may not be any association between totes and item sorting systems, or associations may be dynamic.

At the routing sorter 120, totes including products that have been picked may be routed to the appropriate or designated item sorting system. For example, the routing sorter 120 may optionally determine an identifier associated with the tote, and may determine one or more item sorting systems to which the tote is to be routed using the identifier or using another factor, such as sortation system load. The routing sorter 120 may route or direct the tote to an item sorting system.

The item sorting systems 130 may include one or more item sorting system machines. In FIG. 1, a first item sorting system 132, a second item sorting system 134, a third item sorting system 136, and so forth may be included. Any number of item sorting systems may be included. Some or all of the item sorting systems may optionally be associated with certain totes. The item sorting systems may be used to consolidate or otherwise aggregate products for single or multi-item orders and/or for transfer to a different fulfillment center. For example, a first tote may include a first item of a multi-item order, and a second tote may include a second item of the multi-item order. The item sorting system may therefore identify the orders associated with the respective products in a tote, and may transport the products to a container, such as a tote, a flexible container, a specific chute leading to a container, or a different container associated with the order. When the order is complete with all of the products in the associated chute or container, the order may be packed. In instances where a container is designated for a different fulfillment center, as opposed to an online order, the container may be packed when full, as opposed to when certain items are placed into the container (e.g., there may not be any specific items that need to be in the container before packing, rather, the container may just be a certain threshold full, etc.). Accordingly, a specific item sorting system may be designated for fulfillment of a particular multi-item order. As a result, all of the products in the multi-item order may be placed in totes that are directed to that particular item sorting system. At the item sorting systems 130, totes that are received via the routing sorter 120 may be emptied, and the products in the respective totes may be transported to the appropriate chutes or containers for the orders for which the products were picked.

After a single or multi-item order is complete (e.g., the item sorting system has delivered all of the products in the order to the appropriate chute, container, etc.), or when a container designated for another fulfillment center is full (where full is a configurable threshold, such as about 60% full capacity, 70% full capacity, 80% full capacity, 90% full capacity, etc.), the order may be packed at the packing station 140. In some embodiments, one or more packing stations may be included. In some instances, a packing station may service more than one item sorting system, while in other instances, more than one packing station may service one item sorting system. In the illustration of FIG. 1, a first packing station 142 may be used to pack orders from the first item sorting system 132, a second packing station 144 may be used to pack orders from the second item sorting system 134, a third packing station 146 may be used to pack orders from the third item sorting system 136, and so forth. At the packing stations 140, the orders may be placed into boxes and sealed for subsequent shipment. The packages may then be processed for shipment to the user. For example, the packages may be placed into foldable containers or other types of containers for shipment to another fulfillment center, a sort center, or another facility. At the subsequent facility, the container may be dumped to remove its contents. At various points throughout the facility, totes, carts, boxes, Gaylords, and/or other types of containers may be unloaded by the container unloading systems described herein.

At the fulfillment center, an example process flow 150 illustrated in FIG. 1 may be implemented to improve the efficiency and/or throughput of the fulfillment center. At a first block 160, items may be picked from the robotic storage platform 110 into a tote that may optionally be associated with a specific item sorting system. At a second block 170, the tote may be sent to the routing sorter 120 for routing to an item sorting system. At a third block 180, the items from the tote may be sorted for an order with multiple item by the specific item sorting system. At a fourth block 190, the items may be packed into a shipment when all of the items in the order are sorted.

Figure 2:
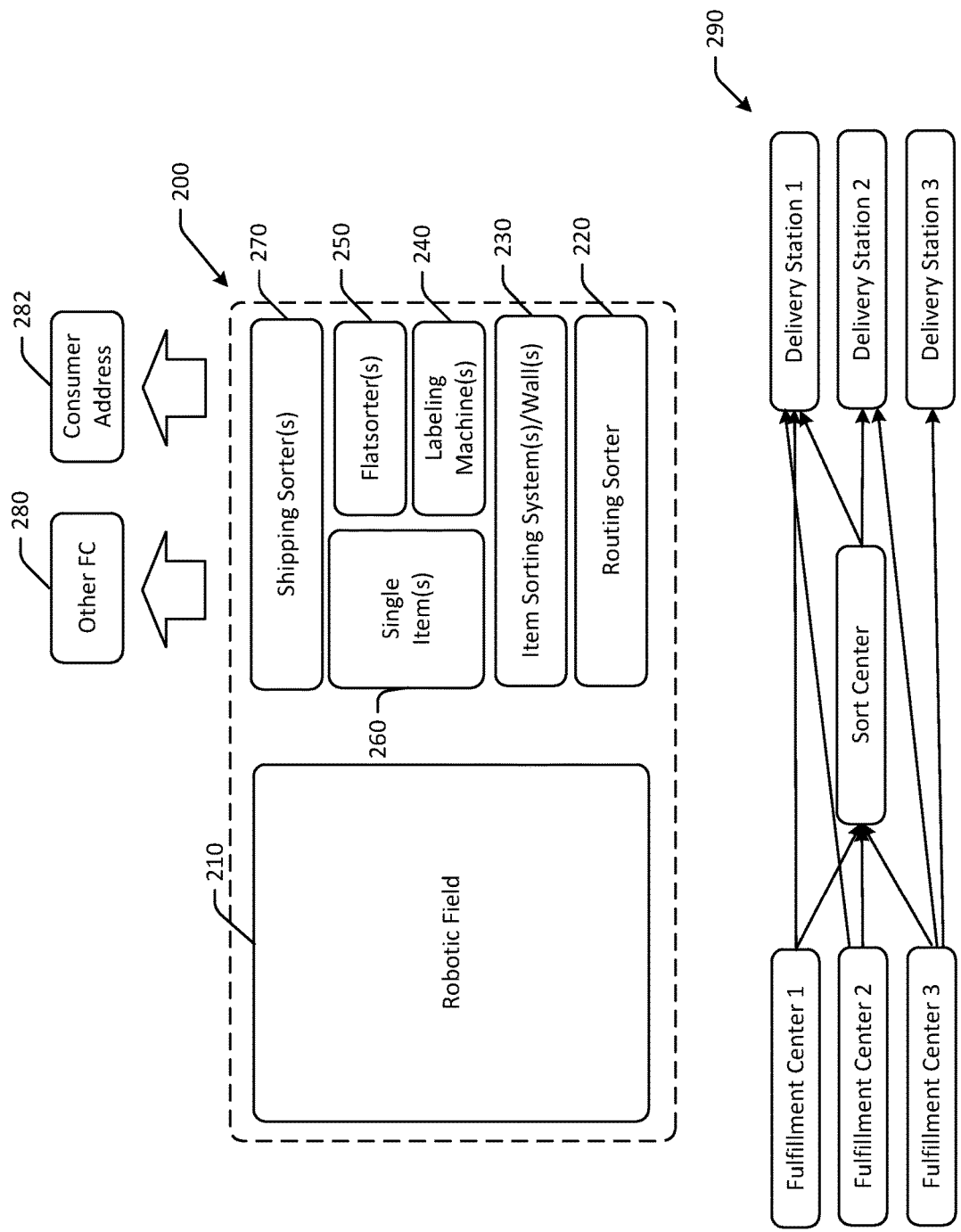
FIG. 2 is a hybrid schematic illustration of an example use case for container dumpers having controlled unloading throughout a facility in accordance with one or more embodiments of the disclosure.

FIG. 2 is a hybrid schematic illustration of an example use case for container dumpers having controlled unloading throughout a facility in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking (e.g., optionally in one or more flexible container pods, etc.), one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting system machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting system machines 230 may include multiple chutes, such as about 328 chutes, and may be configured to sort items at a rate of about 2,100 units per hour or more. In some instances, the item sorting system machines 230 may have two inductors (e.g., one on each side, etc.), and may be modular. For example, the item sorting system machines 230 may each include sixteen expansion modules, where expansion modules may be defined as three two-sided columns next to one another for a total length of about 80 feet. The item sorting system machines 230 may reduce labor and capital costs associated with processing orders.

In some embodiments, the item sorting system 230 may replace other processes, such as manual processes. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"×14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting system machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote including a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 282, and so forth.

Accordingly, in some embodiments, item sorting systems may be arranged in rows and may receive totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting system machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Some embodiments may be used across facilities in a fulfillment network. An example fulfillment network 290 is depicted in FIG. 2. The fulfillment network 290 may include a number of fulfillment centers, a number of sort centers, a number of delivery stations, and so forth. The fulfillment centers may be used to pack items for fulfillment. Packed items may be routed to a sort center for redirection to an appropriate delivery station. In some instances, packed items may be routed directly to a delivery station while bypassing sort centers. Embodiments of the containers described herein may be configured to move from a first facility to a second facility, a third facility, and so on, so as to seamlessly move amongst different facilities in a fulfillment network. For example, a container may move from a fulfillment center to a sort center, and then on to a delivery station or other facility, thereby providing a flexible and dynamic solution. At various points along the network of facilities, containers may be unloaded using the container unloading systems described herein.

Embodiments of the disclosure include container unloading systems for various container types. The container unloading systems may be configured to unload more than one container type, and may be configured to automatically unload contents of a container using controlled conveyor operation. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
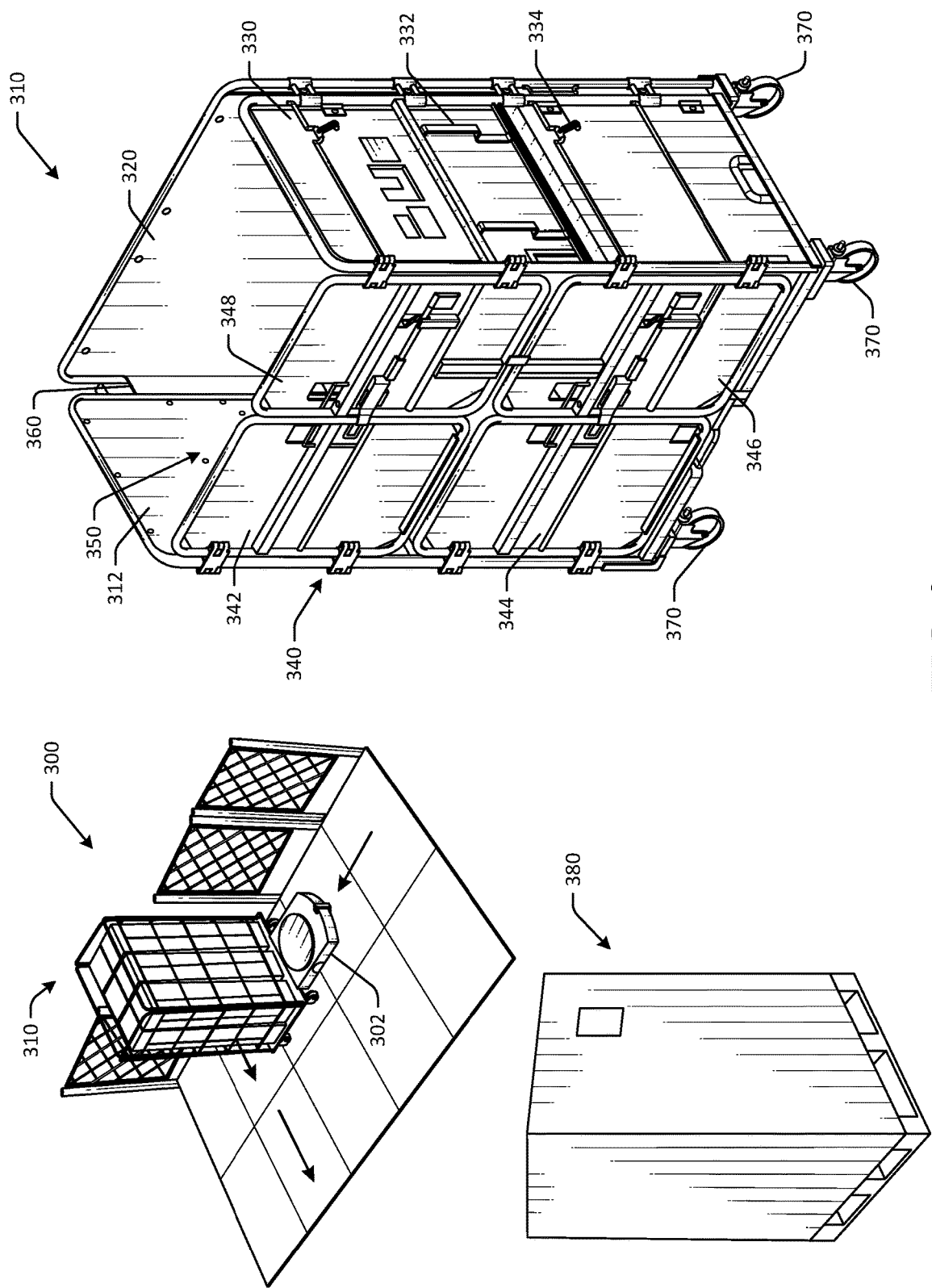
FIG. 3 is a schematic illustration of a container being transported using an autonomous robot, and various types of containers for use with container dumpers in accordance with one or more embodiments of the disclosure.

FIG. 3 is a schematic illustration of a container being transported using an autonomous robot, and various types of containers for use with container dumpers in accordance with one or more embodiments of the disclosure. Other embodiments may include additional or fewer components. The illustration of FIG. 3 is not to scale, and may not be illustrated to scale with respect to other figures. Container types in addition to, or other than, those shown in the example of FIG. 3 may be unloaded using the container unloading systems described herein.

In the example of FIG. 3, a cart, such as a foldable container 310, may be positioned in an environment 300, such as a fulfillment center floor, a warehouse environment, or another environment. Various types of containers, such as the foldable container 310, a Gaylord or other type of cardboard container 380, and other types of containers may be unloaded using the container unloading systems described herein.

The foldable container 310 may have one or more mesh sidewalls in some embodiments. In other embodiments, the foldable container 310 may have solid sidewalls. To move throughout the environment 300, the foldable container 310 may be rolled using one or more wheels. For example, a manual operator may move the foldable container 310 by pushing or pulling the foldable container 310 from one location to another. The foldable container 310 may receive, carry, and transport various packages, boxes, items, products, or other objects of various types. In addition, the foldable container 310 may be configured to be lifted, carried, moved, and placed between positions within a material handling facility by robotic drive units, such as the robot 302, or other material handling equipment. In this manner, the foldable container 310 can be pushed by associates on surfaces, e.g., sort center floors, and the foldable container 310 can also be carried and transported by robotic drive units or robots 302.

The foldable container 310 may also be moved using the robot 302, such as an autonomous robot. For example, the robot 302 may be configured to tunnel or otherwise position itself underneath the foldable container 310. The robot 302 may then lift the foldable container 310 off the ground, such that the wheels are separated from the ground, and the robot 302 may then transport the foldable container 310 from one location to another.

The foldable container 310 may maintain the ability to be moved by humans and robots, while also maintaining the ability to fold from a rectangular configuration to an L-shaped folded configuration. The foldable container 310 may include a locking bottom container platform that provides structural rigidity to enable lifting by the robot 302, while also providing the ability for the foldable container 310 to fold.

Accordingly, the foldable container 310 may be configured to be transported using both (i) the one or more, or plurality, of wheels via manual pushing, and (ii) robotic manipulation to lift and move the foldable container 310, such as by the robot 302. The foldable container 310 may be configured to allow an autonomous robot, such as the robot 302, to tunnel underneath a bottom container platform of the foldable container 310. The foldable container 310 may be configured to be lifted from the bottom container platform by an autonomous robot or other robot 302 that is positioned at least partially or entirely underneath a center or middle portion of the foldable container 310 when the foldable container 310 is in the unfolded position (e.g., a rectangular configuration, etc.).

The wheels may include one or more freely-rotating swivel casters associated with a bottom surface of the foldable container 310. For example, the foldable container 310 may include four freely-rotating swivel casters, with one positioned at each corner of the foldable container 310. In some examples, two of the four casters may have a swivel locking feature, such as a manually or foot-operated swivel locking feature, and the other two of the four casters may have a caster rotation locking feature, such as a manually or foot-operated caster rotation locking feature.

One example of a container type that can be unloaded by the container unloading systems described herein is the Gaylord 380 (which may or may not be disposed on a pallet), and another example is the foldable container 310. For Gaylords or other cardboard containers, the containers may have one or more perforated edges and/or perforations along a face that allow a portion of the cardboard container to be removed, so as to couple the container to a container dumping system as described herein. The foldable container 310 may include a first sidewall 312, a rear wall 320, a second sidewall 330, and front doors 340. Some or all of the walls may be formed of panels, such as plastic panels, and may include various types of plastic or other components. For example, some portions of some or all of the walls may include plastic or other materials that are configured to facilitate sensing or other detection of contents loaded in the foldable container 310. One or more of the walls may be transparent, so as to provide visibility into the contents of the foldable container 310. The panels may be smooth and flat, so as to allow items to move smoothly along the panels. The foldable container 310 may have a greater cross-sectional area (e.g., from a top cross-sectional perspective, a side cross-sectional perspective, etc.) at or near a bottom or lower portion of the foldable container 310 than at or near a top or upper portion of the foldable container 310. This may provide a funnel-like effect when dumping items out of the foldable container 310, so as to improve item flow and reduce a likelihood for jams. The four walls of the foldable container 310 may form a rectangular configuration when the foldable container 310 is in an unfolded configuration. Accordingly, items, such as packages, may be disposed in an inside portion 450 of the foldable container 310 when the foldable container 310 is in the unfolded position. The foldable container 310 may include one or more wheels 370 that allow the foldable container 310 to be manually pushed and/or pulled.

The rear wall 320 may include one or more lips 360 that extend from the rear panel and cover a joint between the first sidewall 312 and the rear wall 320, and/or a joint between the second sidewall 330 and the rear wall 320. The lip 360 may prevent packages or other items from getting caught or pinched between the walls of the container. The lip(s) may include a second smooth panel extension disposed perpendicular to the first flat portion, where the second smooth panel extension covers at least a portion of the second joint.

The second sidewall 330 may include one or more ergonomic handles 332 that are disposed on an outer side of the panel(s) of the second sidewall 330. The ergonomic handles 332 may be formed so as to not extend beyond a frame of the second sidewall 330, and may be disposed relatively higher than a jog formed in the panel of the second sidewall 330. This may be possible due to the jog creating space for the ergonomic handles 332. A hook 334 or other coupling mechanism to couple foldable containers together may be coupled to the second sidewall 330. The second sidewall 330 may be configured to rotate with respect to the rear wall 420.

A fixed hinge or other mechanism may be disposed at a connection between the first sidewall 312 and the rear wall 320. In some embodiments, electronic devices, such as tracking devices, may be coupled to the foldable container 310 at or near the fixed hinge, or elsewhere on the foldable container 310. For example, some embodiments may include Bluetooth-based devices that are configured to provide location data, or data that may be used to locate a particular foldable container, disposed at or near the fixed hinge. Other embodiments may include RFID devices, NFC devices, or other transceiver components that can be used to provide positioning data for a foldable container. Such data may be used to identify the location of a foldable container inside a facility.

The front doors 340 may be formed of one or more panels. For example, the front doors 340 may include a first panel 342 and a second panel 344 that form a first door. The first panel 342 and the second panel 344 may be coupled to the first sidewall 312. The first panel 342 and the second panel 344 may be coupled to one another or may be decoupled, such that the first panel 342 may rotate with respect to the second panel 344. The first panel 342 and the second panel 344 may be configured to rotate with respect to the first sidewall 312. For example, the first panel 342 and the second panel 344 may be configured to rotate until parallel with the first sidewall 312.

The front doors 340 may include a third panel 348 and a fourth panel 346 that form a second door. The third panel 348 and a fourth panel 346 may be coupled to the second sidewall 330. The third panel 348 and a fourth panel 346 may be coupled to one another or may be decoupled, such that the third panel 348 may rotate with respect to the fourth panel 346. The third panel 348 and a fourth panel 346 may be configured to rotate with respect to the second sidewall 330. For example, the third panel 348 and a fourth panel 346 may be configured to rotate until parallel with the second sidewall 330.

The wheels 370 may be self-positioning swivel casters may have associated home positions that may be defined positions or orientations of the swivel casters when lifted, stationary, and/or stopped. For example, the home positions of self-positioning swivel casters associated with a container, cart, or other material handling equipment may increase or maximize space or clearance under the cart when the cart is stationary or stopped. In some example embodiments, robotic drive units or other types of material handling equipment, e.g., manual, automated, or robotic equipment, may be inserted or placed under the cart and between the self-positioning swivel casters, such that increasing or maximizing space or clearance under the cart and between the self-positioning swivel casters may facilitate reliable operations and prevent collisions or interferences between robotic drive units and portions of the cart. In other example embodiments, the home positions of self-positioning swivel casters associated with a container, cart, or other material handling equipment may be positioned substantially within an outer periphery, dimensions, or footprint associated with a receptacle of the cart when the cart is stationary or stopped, such that a plurality of carts may be positioned or stored adjacent to each other with minimal gap or clearance therebetween and without causing interference between respective swivel casters associated with adjacent carts. In addition, the home positions of self-positioning swivel casters associated with a cart or other material handling equipment may enable a cart to substantially remain in position when lifted, stationary, or stopped. For example, a cart may be placed at a position on a substantially flat or horizontal floor or other surface of a material handling facility. However, due to irregularities, imperfections, protrusions, indentations, edges, slopes, angles, cracks, debris, or other surface characteristics associated with the surface, a cart that is stationary or stopped may move or drift, e.g., due to gravity. The home positions of self-positioning swivel casters may be selected or configured to prevent such movement or drift of a cart due to surface characteristics associated with a position at which the cart is placed.

Figure 4:
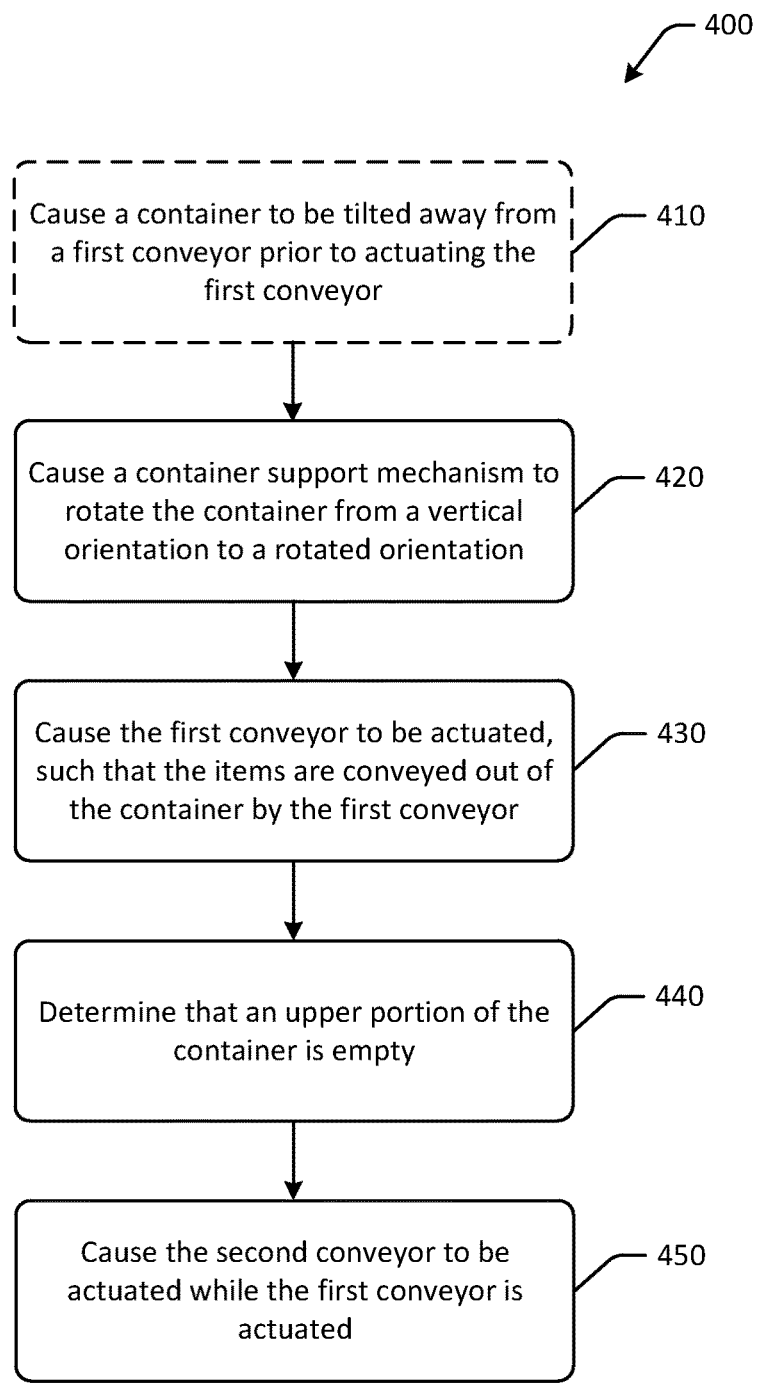
FIG. 4 is a schematic illustration of an example process flow for unloading containers using container dumpers having controlled unloading in accordance with one or more embodiments of the disclosure.

FIG. 4 is a schematic illustration of an example process flow 400 for unloading containers using container dumpers having controlled unloading in accordance with one or more embodiments of the disclosure. Other embodiments may include additional or fewer components. The operations of FIG. 4 may be performed by one or more computer systems, such as a controller of a container dumping system. One or more of the operations may be optional and/or may be performed in a different sequence than that depicted in the example of FIG. 4. Some of the operations may be performed at least partially concurrently. The process flow 400 may be performed in conjunction with any of the dumpers described with respect to FIGS. 1-3.

Execution of the operations of the process flow 400 may be performed to unload or dump container contents onto a conveyor surface, such as a takeaway conveyor in a controlled manner. Some embodiments may utilize additional and/or different operations.

At optional block 410, a controller in communication with a container dumping system may be configured to cause a container to be tilted away from a first conveyor prior to actuating the first conveyor. The first conveyor may be part of a container dumping system, where the container dumping system includes a set of one or more conveyors (that includes the first conveyor), a platform onto which a container can be loaded for unloading, and an optional takeaway conveyor. The set of conveyors may be configured to rotate from a vertical orientation to an angled orientation in conjunction with the platform and container loaded thereon. Prior to actuating the first conveyor and/or prior to coupling the container to the set of conveyors, the container may be tilted away from the set of conveyors, so as to cause items inside the container to fall towards a rear of the container. As a result, items may not fall out of the container when a container door on a front side of the container is opened. The tilting process is described in detail with respect to FIG. 5. For containers that have slideable surfaces or sidewalls and/or for containers that have removable portions, such as cardboard containers with removable sides (e.g., perforated sides), tilting may not be used, as the container can be coupled to the conveyor and the removable piece can be removed after coupling.

Figure 6A:
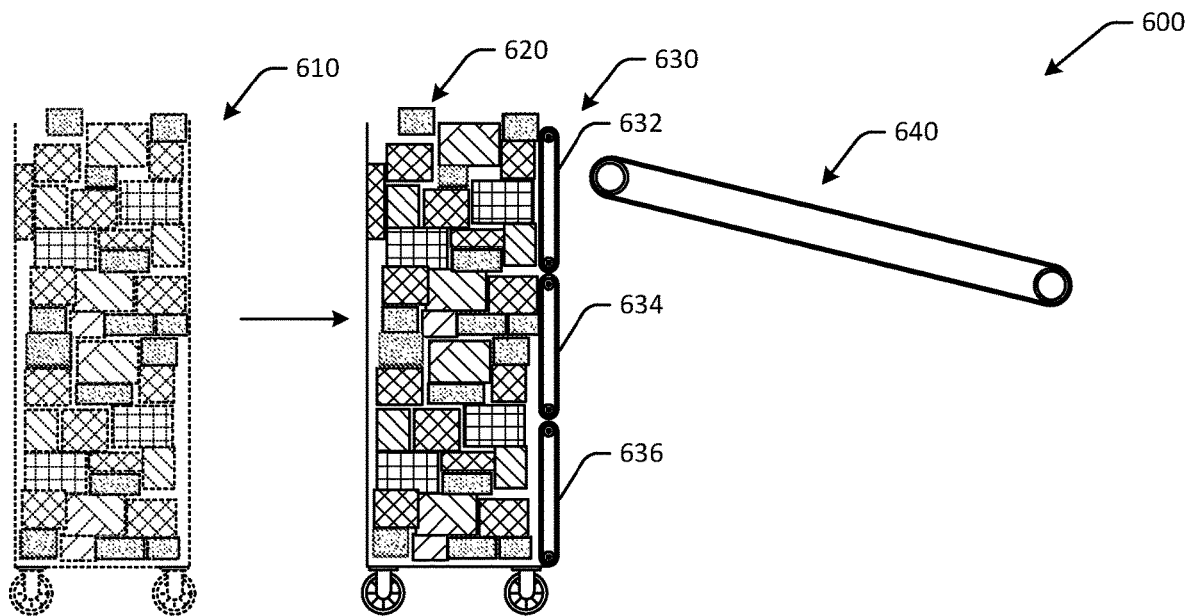
FIGS. 6A-6C are schematic illustrations of a container being dumped using a container dumper in accordance with one or more embodiments of the disclosure.
Figure 6A:
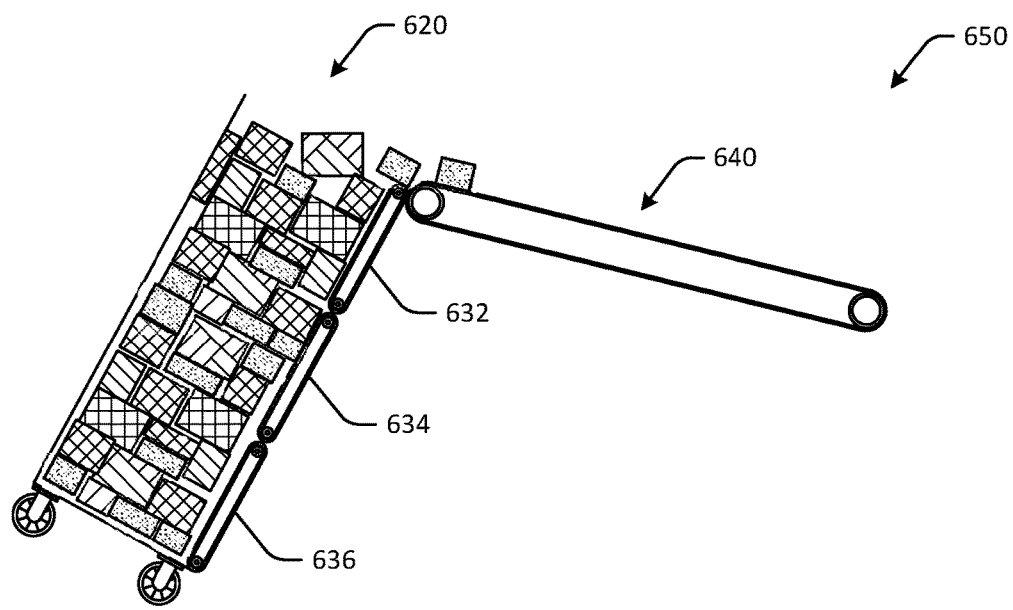
Figure 6B:
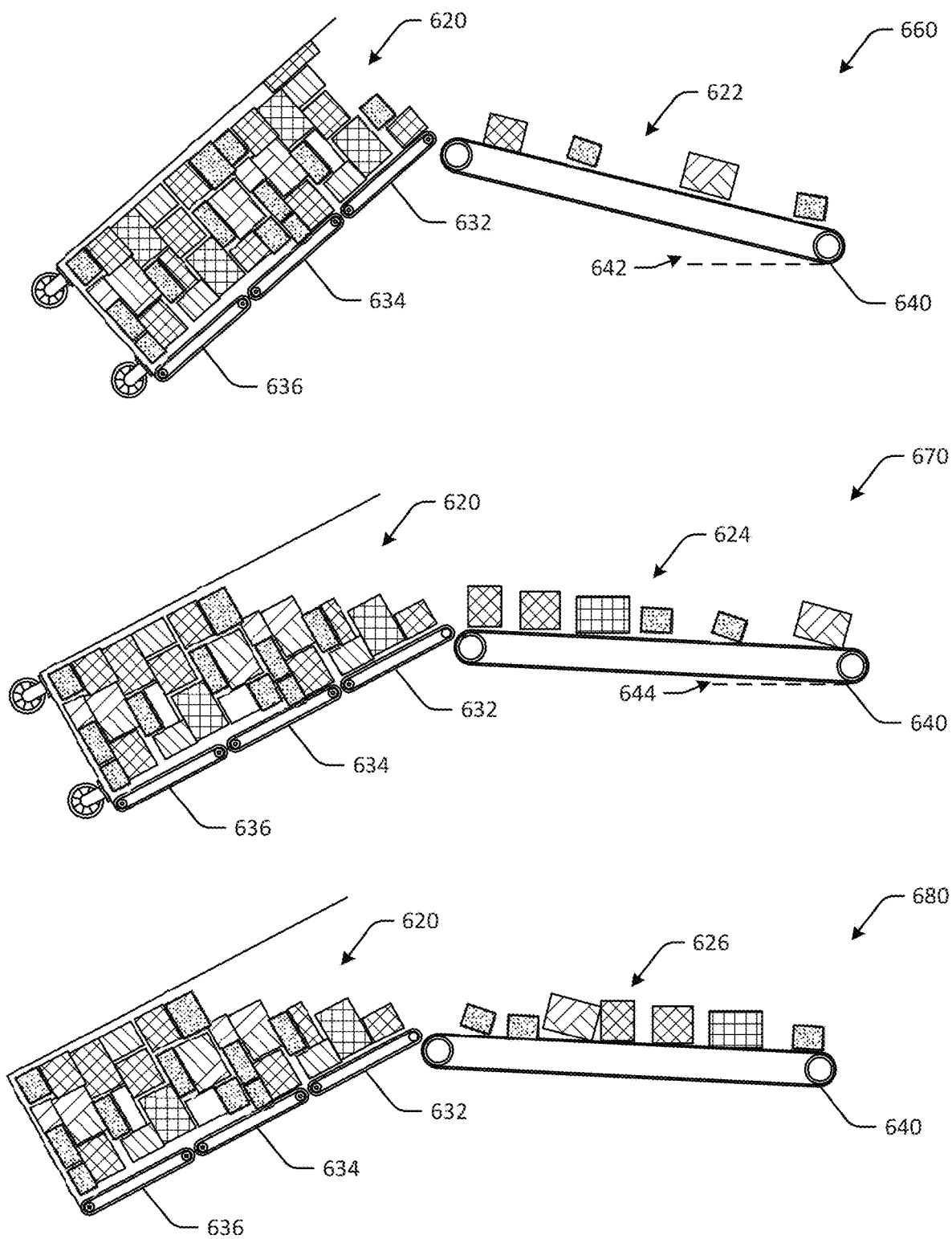

At block 420, the controller may cause the container support mechanism to rotate the container from a vertical orientation to a rotated orientation. For example, the platform or other container support mechanism of the container unloading system may cause the container to be rotated from an upright position to an angled position or a rotated orientation, as depicted in FIGS. 6A-6B. The set of conveyors may rotate with the container.

At block 430, the controller may cause the first conveyor to be actuated, such that the items are conveyed out of the container by the first conveyor. For example, one or more conveyors may be disposed adjacent to the items inside the container, and actuation of the first conveyor may cause items in contact with the first conveyor and/or adjacent to items in contact with the first conveyor to be pushed towards a top of the container and out of the container. The items towards an upper portion of the container may therefore be unloaded as the first conveyor is actuated.

At block 440, the controller may determine that an upper portion of the container is empty. For example, the controller may be in communication with one or sensors, such as camera sensors, photo eye sensors, proximity sensors, time of flight sensors, and/or other types of sensors, and may use feedback from the sensor(s) to determine whether a certain portion of the container, such as an upper portion, a middle portion, a lower portion, and so forth, is empty. In some embodiments, the controller may be configured to determine a level of fullness of the container using the one or more sensors. The sensors may be coupled to the platform and/or a different portion of the container dumping system.

At block 450, the controller may cause the second conveyor to be actuated while the first conveyor is actuated. For example, because the upper portion of the container that corresponds to the first conveyor is empty, the controller may cause unloading of the middle portion of the container by actuation of the second conveyor, where the second conveyor is adjacent to the first conveyor (and both are part of the set of conveyors). The process may continue until the container is unloaded.

In some embodiments, the container may be paused during rotation, such as paused at an angle, whereas in other embodiments, the container may be rotated from an upright position to a horizontal position without pausing. For example, in some embodiments, the rotated orientation may be a horizontal orientation, and the container may be rotated from a vertical orientation to the horizontal orientation with at least one pause during the rotation. In another example, the rotated orientation may be a horizontal orientation, and the container may be rotated from the vertical orientation to the horizontal orientation without pausing during the rotation.

Figure 5:
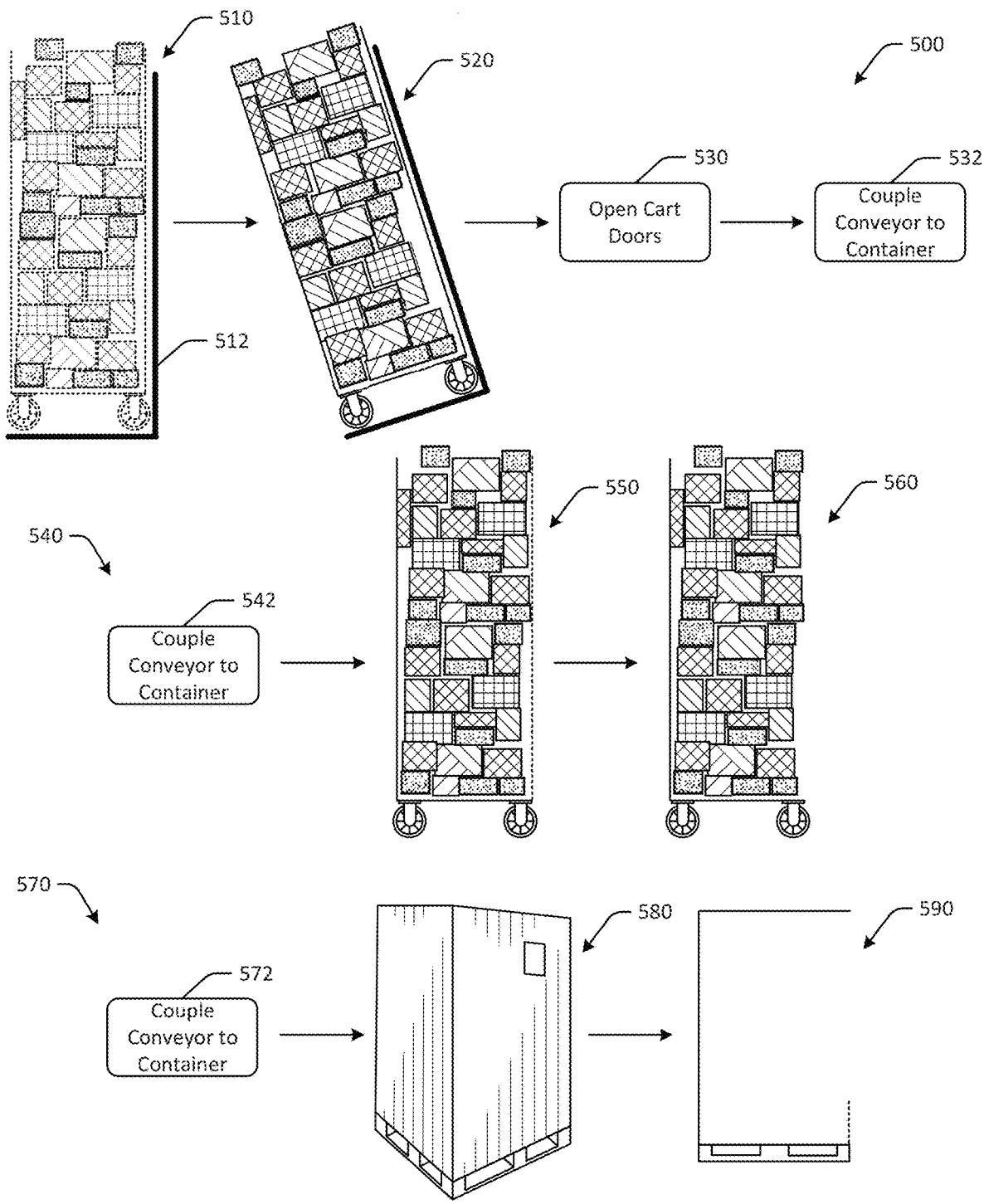
FIG. 5 is a schematic illustration of various container coupling processes to couple containers to container dumpers in accordance with one or more embodiments of the disclosure.

FIG. 5 is a schematic illustration of various container coupling processes to couple containers to container dumpers in accordance with one or more embodiments of the disclosure. Other embodiments may include additional or fewer operations. The illustration of FIG. 5 may not be to scale, and may not be illustrated to scale with respect to other figures. The example containers illustrated in FIG. 5 may be the same or different container types than those discussed with respect to FIGS. 1-4.

In a first use case 500, a container with rotatable doors at a front side may be used with a container dumping system as described herein. The container dumping system may include a container support mechanism configured to secure a container, such as a platform, dumper bucket, and so forth. The container may have items therein. The system may include a first conveyor configured to rotate from a first position to a second position, where the first conveyor is disposed in a vertical orientation adjacent to a sidewall of the container in the first position, and the first conveyor is disposed in a non-vertical orientation or an angled orientation adjacent to the sidewall of the container in the second position. The system may include a second conveyor aligned with the first conveyor, where the second conveyor is disposed adjacent to the first conveyor. The system may include a takeaway conveyor configured to receive the items unloaded from the container, where the first conveyor rotates relative to the takeaway conveyor. The system may include a controller configured to cause the container support mechanism to rotate the container from a vertical orientation to a rotated orientation, and cause the first conveyor to be actuated, such that the items are conveyed out of the container by the first conveyor.

In the first use case 500, at a first operation 510, the container may have doors that open towards the right hand side of the page. The container may be loaded onto a container support mechanism or platform 512 of the container dumping system, where the container support mechanism is depicted as an "L"-shaped platform. At a second operation 520, the container support mechanism 512 may tilt the container away from the doors of the container (which would be tilted towards the left hand side of the page in the example of FIG. 5). As the container is tilted, the items inside the container may be moved away from the doors of the container, so as to allow for the doors to be safely opened without items falling out. At a third operation 530, the cart or other container doors may be opened. The cart or container may be returned to a flat or level position prior to opening the doors in some embodiments, whereas in other embodiments, the cart or container may remain tilted when the doors are opened. At a fourth operation 532, the container may be coupled to the conveyor of the container dumping system, as described with respect to FIGS. 6A-6B.

In a second use case 540, a container with a sliding or removable door may be used with the container dumping system. At a first operation 542, the container may be coupled to the conveyor of the container dumping system. At a second operation 550, the sliding or removable door may be slid or removed from between the container and the conveyor, thereby allowing for items in the container to be contacted by the conveyor. The sliding or removable door is depicted using dashed lines. At a third operation 560, the container may be unloaded using the conveyors of the container dumping system. As a result, the container may not have to be tipped prior to coupling to the conveyor of the container dumping system.

In a third use case 570, a cardboard container with a removable portion, such as a Gaylord with a surface that can be cut or a perforated surface may be used with the container dumping system. At a first operation 572, the container may be coupled to the conveyor of the container dumping system. At a second operation 580, the removable portion of the cardboard container may be removed from between the container and the conveyor, thereby allowing for items in the container to be contacted by the conveyor. At a third operation 560, the container may be unloaded using the conveyors of the container dumping system. The removable portion may be an entire side of the container, or may be a portion of the container, such as the remaining portion depicted using dashed lines. As a result, the container may not have to be tipped prior to coupling to the conveyor of the container dumping system.

Figure 6C:
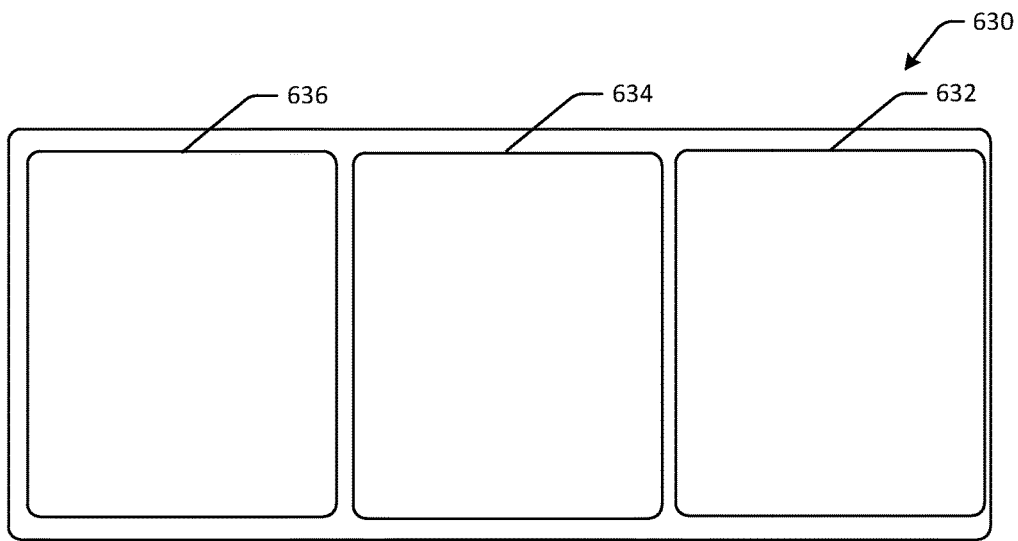
Figure 6C:
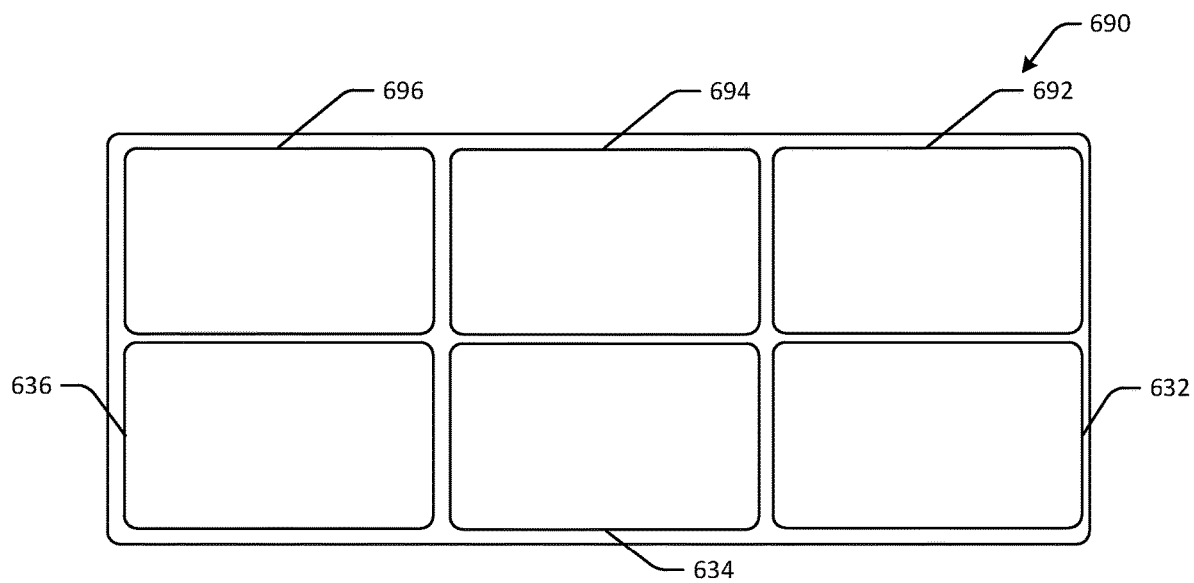

FIGS. 6A-6C are schematic illustrations of a container being dumped using a container dumper in accordance with one or more embodiments of the disclosure. Other embodiments may include additional or fewer components. The illustrations of FIGS. 6A-6C may not be to scale, and may not be illustrated to scale with respect to other figures. The components illustrated in FIGS. 6A-6C may be used with any of the container dumping systems discussed with respect to FIGS. 1-5.

At a first instance, a container unloading system 600 may include a container support mechanism configured to secure a container 610, where the container 610 has items 620 therein. The container unloading system 600 may have an optional platform (such as that illustrated in FIG. 5) configured to support a lower portion of the container 610, where the platform is configured to move with the container when the container is rotated. The container unloading system 600 may include one or more conveyors 630, such as a first conveyor 632 configured to rotate from a first position to a second position, where the first conveyor 632 is disposed in a vertical orientation adjacent to a sidewall of the container 610 in the first position, and the first conveyor 632 is disposed in a non-vertical orientation adjacent to the sidewall of the container 610 in the second position (e.g., the angled position of the first conveyor 632 at a second instance 650, etc.). The first conveyor 632 may be configured to convey items out of the container 610, such as out of a top portion of the container 610.

The one or more conveyors 630 may include a second conveyor 634 aligned with the first conveyor 632, where the second conveyor 634 is disposed adjacent to the first conveyor 632, and the second conveyor 634 is configured to convey items out of the container 610, such as out of a middle portion of the container 610. The first conveyor 632 may be positioned closer to a top of the container 610 than the second conveyor 634. The one or more conveyors 630 may include a third conveyor 636 aligned with the second conveyor 634, where the third conveyor 636 is disposed adjacent to the second conveyor 634, and the third conveyor 636 is configured to convey items out of the container 610, such as out of a bottom portion of the container 610. The second conveyor 634 may be positioned closer to a top of the container 610 than the third conveyor 636. Any number of conveyors or conveyor segments may be used.

The container unloading system 600 may include a takeaway conveyor 640 configured to receive the items unloaded from the container 610, where the first conveyor 632 may be configured to rotate relative to the takeaway conveyor 640. In some embodiments, the takeaway conveyor 640 may be configured to move, pivot, or rotate. For example, at the first instance, the takeaway conveyor 640 may be at an angled orientation having a first angle 642 with respect to horizontal, whereas at the second instance 650, the takeaway conveyor 640 may be at an angled orientation having a second angle 644 with respect to horizontal. In other embodiments, the takeaway conveyor 640 may have a fixed positon. In some instances, the takeaway conveyor 640 may be configured to move from a third position at a first angle relative to the first conveyor 632 to a fourth position at a second angle relative to the first conveyor 632, such that the takeaway conveyor 640 is in the third position when the first conveyor 632 is in the first position (e.g., the vertical position), and the takeaway conveyor 640 is in the fourth position when the first conveyor 632 is in the second position (e.g., a non-vertical or angled position, etc.).

The individual conveyors 632, 634, 636 may be independently actuated, so as to cause items from different portions of the container 610 to be unloaded. For example, actuation of the first conveyor 632 alone may cause items at the top of the container 610 to be unloaded. Actuation of the second conveyor 634 and the first conveyor 632 at the same time may cause items in the middle of the container 610 to be unloaded. Actuation of all of the conveyors at the same time may cause items at a bottom of the container to be unloaded.

At the first instance, the container may be coupled to the conveyors 630 of the container unloading system 600. At the second instance 650, the first conveyor 632 may be actuated, and items 620 inside the container, and particular items at or near a top of the container 610, may be unloaded onto the takeaway conveyor 640. Although the conveyors 630 are depicted at different distances from the takeaway conveyor 640 in the first and second instances, the change in distance may be due to movement of the takeaway conveyor 640. In other embodiments, the conveyors 630 may be disposed adjacent to the takeaway conveyor 640 at a fixed distance (e.g., where the takeaway conveyor 640 has a fixed position).

At a third instance 660 in FIG. 6B, items 622 at the top or upper portion of the container 610 may be unloaded onto the takeaway conveyor 640. As the upper portion of the container 610 is emptied, the controller may use sensor feedback to determine when to actuate the second conveyor 634. For example, the container unloading system 600 may include one or more sensors disposed external to the container 610, such as coupled to the container support mechanism and/or the conveyors 630, and sensor feedback may be used to determine whether items are present in a certain portion of the container 610.

At a fourth instance 670, as the upper portion of the container is emptied, the second conveyor 634 may be actuated while the first conveyor 632 remains actuated, such that both conveyors are actuated or active at the same time. As the second conveyor 634 moves, items 624 from the middle portion of the container 610 may be unloaded.

At a fifth instance 680, as the middle portion of the container is emptied, the third conveyor 636 may be actuated while the first conveyor 632 and the second conveyor 634 remain actuated, such that each conveyor is actuated or active at the same time. As the third conveyor 636 moves, items 626 from the bottom portion of the container 610 may be unloaded.

In this manner, items may be unloaded from the container using a controlled process where items falling on top of each other are limited and risk of potential damage is minimized. In addition, the takeaway conveyor 640 may slowly move from an angled position to a flat position to increase singulation or distance between adjacent item, which may be desired for downstream processing. Further, as a result of the controlled conveyor movement, the container may not have to rotate fully to an inverted position, and may not even have to rotate to a horizontal position for dumping or unloading of containers.

In FIG. 6C, the conveyors 630 are depicted in a top view, where the individual conveyor segments may be disposed in a linear arrangement. In some embodiments, the conveyors may be arranged in a conveyor array 690, where a fourth conveyor segment 692 may be disposed adjacent to the first conveyor segment 632, a fifth conveyor segment 694 may be disposed adjacent to the second conveyor segment 634, a sixth conveyor segment 696 may be disposed adjacent to the third conveyor segment 636, and so forth. Accordingly, one or more conveyors may be arranged in a side-by-side arrangement, which may provide enhanced control and granularity over unloading of packages. In some embodiments, a second conveyor may be disposed adjacent to a first conveyor in a side-by-side arrangement, where the second conveyor is configured to be actuated independent of the first conveyor. In an example sequence, the conveyors may be actuated in a sequence such as the first conveyor segment 632, then the fourth conveyor segment 692, then the second conveyor segment 634, then the fifth conveyor segment 694, then the third conveyor segment 636, then the sixth conveyor segment 696, and so forth.

One or more operations of the methods, process flows, or use cases of FIGS. 1-6C may have been described above as being performed by a user device, or more specifically, by one or more program module(s), applications, or the like executing on a device. It should be appreciated, however, that any of the operations of the methods, process flows, or use cases of FIGS. 1-6C may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6C may be described in the context of the illustrative devices, it should be appreciated that such operations may be implemented in connection with numerous other device configurations.

The operations described and depicted in the illustrative methods, process flows, and use cases of FIGS. 1-6C may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-6C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 7:
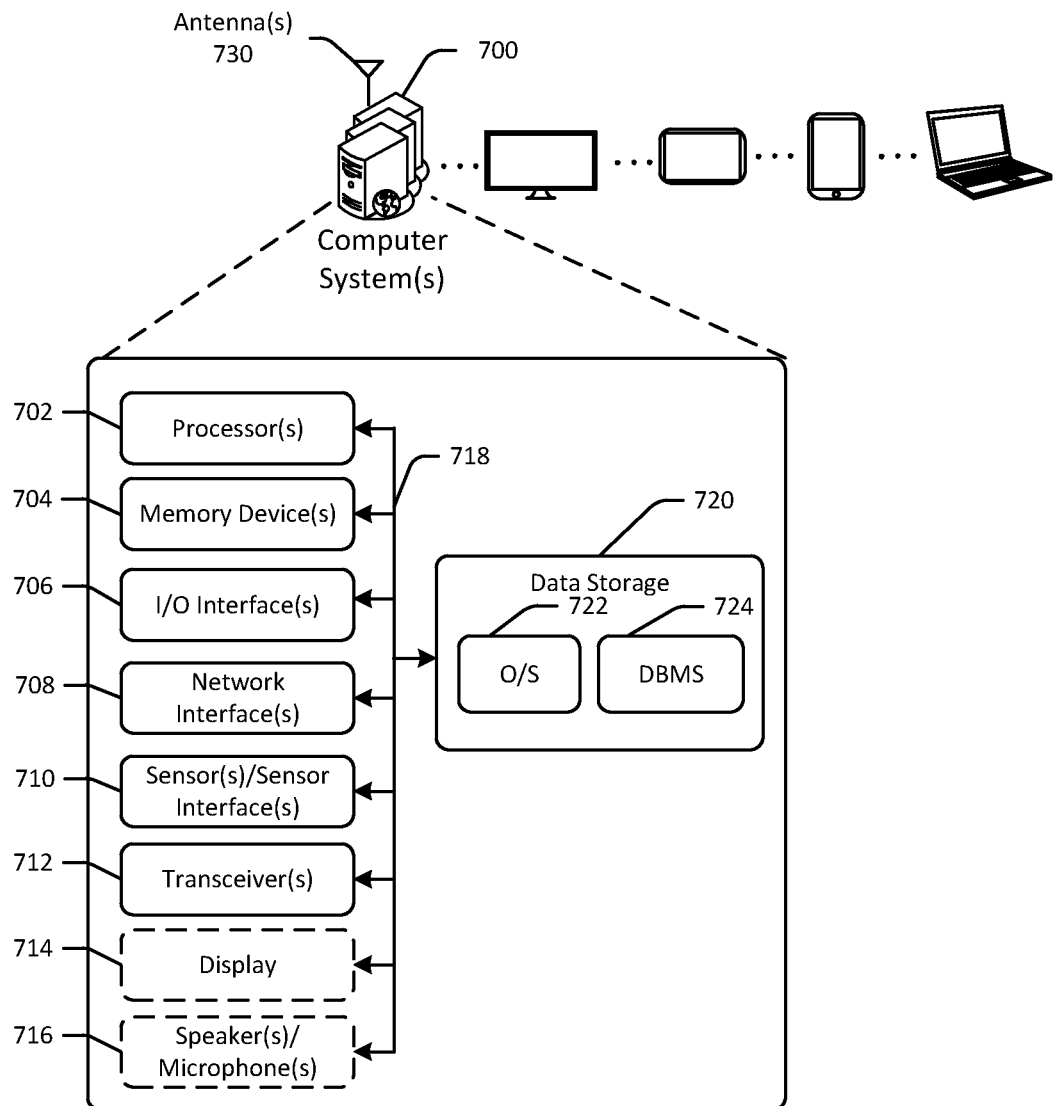
FIG. 7 schematically illustrates an example architecture of a computer system associated with a container dumping system in accordance with one or more embodiments of the disclosure.

FIG. 7 is a schematic block diagram of one or more illustrative computer system(s) 700 in accordance with one or more example embodiments of the disclosure. The computer system(s) 700 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 700 may correspond to an illustrative device configuration for a computer system used in conjunction with any one of the container unloading or dumper system(s) of FIGS. 1-6C, such as container coupling mechanisms and/or conveyor devices.

The computer system(s) 700 may be configured to communicate with one or more servers, user devices, or the like. The computer system(s) 700 may be configured to cause the container dumping system(s) to actuate one or more conveyors, actuate one or more container dumper platforms, retrieve containers, transport containers, and so forth.

The computer system(s) 700 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 700 may include one or more processors (processor(s)) 702, one or more memory devices 704 (also referred to herein as memory 704), one or more input/output (I/O) interface(s) 706, one or more network interface(s) 708, one or more sensor(s) or sensor interface(s) 710, one or more transceiver(s) 712, one or more optional display(s) 714, one or more optional microphone(s) 716, and data storage 720. The computer system(s) 700 may further include one or more bus(es) 718 that functionally couple various components of the computer system(s) 700. The computer system(s) 700 may further include one or more antenna(s) 730 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit the exchange of information (e.g., data (including computer-executable code), signaling, etc.) between various components of the computer system(s) 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 704 of the computer system(s) 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to the memory 704 for use by the processor(s) 702 during the execution of the computer-executable instructions. Moreover, output data generated as a result of execution of the computer-executable instructions by the processor(s) 702 may be stored initially in the memory 704, and may ultimately be copied to the data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like. Some or all of these module(s) may be sub-module(s). Any of the components depicted as being stored in the data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in the data storage 720 may support functionality described in reference to corresponding components named earlier in this disclosure.

The data storage 720 may further store various types of data utilized by the components of the computer system(s) 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 702 may be configured to access the memory 704 and execute the computer-executable instructions loaded therein. For example, the processor(s) 702 may be configured to execute the computer-executable instructions of the various program module(s), applications, engines, or the like of the computer system(s) 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to other illustrative components depicted as being stored in the data storage 720, the O/S 722 may be loaded from the data storage 720 into the memory 704 and may provide an interface between other application software executing on the computer system(s) 700 and the hardware resources of the computer system(s) 700. More specifically, the O/S 722 may include a set of computer-executable instructions for managing the hardware resources of the computer system(s) 700 and for providing common services to other application programs (e.g., managing memory allocation among various application programs). In certain example embodiments, the O/S 722 may control execution of the other program module(s). The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 700 is a mobile device, the DBMS 724 may be any suitable lightweight DBMS optimized for performance on a mobile device.

Referring now to other illustrative components of the computer system(s) 700, the input/output (I/O) interface(s) 706 may facilitate the receipt of input information by the computer system(s) 700 from one or more I/O devices as well as the output of information from the computer system(s) 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 730 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 700 may further include one or more network interface(s) 708 via which the computer system(s) 700 may communicate with any of a variety of other systems, platforms, networks, devices, and so forth. The network interface(s) 708 may enable communication, for example, with one or more wireless routers, one or more host servers, one or more web servers, and the like via one or more networks.

The antenna(s) 730 may include any suitable type of antenna depending, for example, on the communications protocols used to transmit or receive signals via the antenna(s) 730. Non-limiting examples of suitable antennas may include directional antennas, non-directional antennas, dipole antennas, folded dipole antennas, patch antennas, multiple-input multiple-output (MIMO) antennas, or the like. The antenna(s) 730 may be communicatively coupled to one or more transceivers 712 or radio components to which or from which signals may be transmitted or received.

As previously described, the antenna(s) 730 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 730 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 730 may be configured to transmit or receive radio frequency signals within any suitable frequency range forming part of the unlicensed portion of the radio spectrum.

The antenna(s) 730 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 730—transmitting or receiving radio frequency (RF) signals in the bandwidth and/or channels corresponding to the communications protocols utilized by the computer system(s) 700 to communicate with other devices. The transceiver(s) 712 may include hardware, software, and/or firmware for modulating, transmitting, or receiving—potentially in cooperation with any of antenna(s) 730—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computer system(s) 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 714 may be configured to output light and/or render content. The optional speaker(s)/microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the computer system(s) 700 may include alternate and/or additional hardware, software, or firmware components beyond those described or depicted without departing from the scope of the disclosure. More particularly, it should be appreciated that software, firmware, or hardware components depicted as forming part of the computer system(s) 700 are merely illustrative and that some components may not be present or additional components may be provided in various embodiments. While various illustrative program module(s) have been depicted and described as software module(s) stored in the data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-6C may be performed by a device having the illustrative configuration depicted in FIG. 7, or more specifically, by one or more engines, program module(s), applications, or the like executable on such a device. It should be appreciated, however, that such operations may be implemented in connection with numerous other device configurations.

The operations described and depicted in the illustrative methods and process flows of any of FIGS. 1-6C may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6C may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container unloading system comprising:
   a container support mechanism configured to secure a container, the container support mechanism comprising a platform configured to support a lower portion of the container, wherein the container comprises items therein;
   a first conveyor configured to rotate from a first position to a second position, wherein the first conveyor is disposed in a vertical orientation adjacent to a sidewall of the container in the first position, and the first conveyor is disposed in a non-vertical orientation adjacent to the sidewall of the container in the second position;
   a second conveyor aligned with the first conveyor, wherein the second conveyor is disposed adjacent to the first conveyor;
   a takeaway conveyor configured to receive the items unloaded from the container, wherein the first conveyor rotates relative to the takeaway conveyor, wherein the takeaway conveyor is configured to move from a third position to a fourth position; and
   a controller configured to:
      cause the container support mechanism to rotate the container from a vertical orientation to a non-vertical orientation;
      cause the container to be tilted away from the first conveyor prior to actuating the first conveyor;
      cause the first conveyor to be actuated, such that the items are conveyed out of the container by the first conveyor;
      determine that an upper portion of the container is empty; and
      cause the second conveyor to be actuated while the first conveyor is actuated.

2. The container unloading system of claim 1, further comprising:
   one or more sensors disposed external to the container, wherein the controller is configured to determine that an upper portion of the container is empty using the one or more sensors.

3. The container unloading system of claim 1, wherein the container is (i) a cardboard container, or (ii) a metal container configured to be stacked with other containers in a nested L-shaped configuration, wherein the metal container is configured to be transported using (i) a plurality of wheels via manual pushing, and (ii) robotic manipulation to lift and move the metal container.

4. A container unloading system comprising:
   a container support mechanism configured to secure a container, wherein the container comprises items therein;
   a first conveyor configured to rotate from a first position to a second position, wherein the first conveyor is disposed in a vertical orientation adjacent to a sidewall of the container in the first position, and the first conveyor is disposed in a non-vertical orientation adjacent to the sidewall of the container in the second position; and
   a controller configured to:
      cause the container support mechanism to rotate the container from a vertical orientation to a rotated orientation;
      cause the container to be tilted away from the first conveyor prior to actuating the first conveyor; and
      cause the first conveyor to be actuated, such that the items are conveyed out of the container by the first conveyor.

5. The container unloading system of claim 4, further comprising:
   a second conveyor aligned with the first conveyor, wherein the second conveyor is disposed adjacent to the first conveyor, and the second conveyor is configured to convey items out of the container.

6. The container unloading system of claim 5, wherein the first conveyor is positioned closer to a top of the container than the second conveyor, and wherein the controller is further configured to:
   determine that an upper portion of the container is empty; and
   cause the second conveyor to be actuated while the first conveyor is actuated.

7. The container unloading system of claim 4, further comprising:
   a second conveyor disposed adjacent to the first conveyor in a side-by-side arrangement, wherein the second conveyor is configured to be actuated independent of the first conveyor.

8. The container unloading system of claim 4, further comprising:
   one or more sensors disposed external to the container;
   wherein the controller is further configured to:
      determine a level of fullness of the container using the one or more sensors.

9. The container unloading system of claim 4, further comprising:
   a takeaway conveyor configured to receive the items unloaded from the container;
   wherein the first conveyor rotates relative to the takeaway conveyor.

10. The container unloading system of claim 9, wherein the takeaway conveyor is configured to move from a third position at a first angle relative to the first conveyor to a fourth position at a second angle relative to the first conveyor;
  wherein the takeaway conveyor is in the third position when the first conveyor is in the first position, and the takeaway conveyor is in the fourth position when the first conveyor is in the second position.

11. The container unloading system of claim 4, wherein the rotated orientation is a non-vertical orientation, and wherein the container is rotated from the vertical orientation to the non-vertical orientation with at least one pause during the rotation.

12. The container unloading system of claim 4, wherein the rotated orientation is a non-vertical orientation, and wherein the container is rotated from the vertical orientation to the non-vertical orientation without pausing during the rotation.

13. The container unloading system of claim 4, further comprising:
  a platform configured to support a lower portion of the container;
  wherein the platform is configured to move with the container when the container is rotated.

14. The container unloading system of claim 4, wherein the container is (i) a cardboard container, or (ii) a metal container configured to be stacked with other containers in a nested L-shaped configuration, wherein the metal container is configured to be transported using (i) a plurality of wheels via manual pushing, and (ii) robotic manipulation to lift and move the metal container.

15. A system comprising:
  a container support mechanism configured to secure a container, wherein the container comprises items therein;
  a first conveyor configured to rotate from a first position to a second position, wherein the first conveyor is disposed in a vertical orientation adjacent to a sidewall of the container in the first position, and the first conveyor is disposed in a non-vertical orientation adjacent to the sidewall of the container in the second position;
  a second conveyor aligned with the first conveyor, wherein the second conveyor is disposed adjacent to the first conveyor;
  a takeaway conveyor configured to receive the items unloaded from the container, wherein the first conveyor rotates relative to the takeaway conveyor; and
  a controller configured to:
    cause the container support mechanism to rotate the container from a vertical orientation to a rotated orientation;
    cause the container to be tilted away from the first conveyor prior to actuating the first conveyor; and
    cause the first conveyor to be actuated, such that the items are conveyed out of the container by the first conveyor.

16. The system of claim 15, further comprising:
  one or more sensors disposed external to the container;
  wherein the controller is further configured to:
    determine that an upper portion of the container is empty using the one or more sensors; and
    cause the second conveyor to be actuated while the first conveyor is actuated.

17. The system of claim 15, wherein the takeaway conveyor is configured to move from a third position at a first angle relative to the first conveyor to a fourth position at a second angle relative to the first conveyor;
  wherein the takeaway conveyor is in the third position when the first conveyor is in the first position, and the takeaway conveyor is in the fourth position when the first conveyor is in the second position.

18. The system of claim 15, wherein the second conveyor is disposed adjacent to the first conveyor in a side-by-side arrangement, and the second conveyor is configured to be actuated independent of the first conveyor.

* * * * *